United States Patent
Kotthoff et al.

(10) Patent No.: US 8,444,740 B2
(45) Date of Patent: May 21, 2013

(54) NONWOVEN FABRIC FOR EXHAUST-GAS TREATMENT, EXHAUST-GAS PURIFICATION DEVICE AND METHOD FOR PRODUCING A NONWOVEN FABRIC FOR EXHAUST-GAS TREATMENT

(75) Inventors: Hubertus Kotthoff, Ruppichteroth (DE); Stefan Seeliger, Alterstedt (DE); Dietmar Chauchet, Köln (DE); Ludwig Wieres, Overath (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/101,512

(22) Filed: May 5, 2011

(65) Prior Publication Data
US 2011/0209451 A1     Sep. 1, 2011

Related U.S. Application Data

(63) Continuation of application No. PCT/EP2009/064025, filed on Oct. 24, 2009.

(30) Foreign Application Priority Data

Nov. 5, 2008    (DE) .......................... 10 2008 056 054

(51) Int. Cl.
*B01D 39/14*    (2006.01)
*B01D 39/06*    (2006.01)
*B01D 24/00*    (2006.01)
*B01D 50/00*    (2006.01)
*B21F 27/06*    (2006.01)

(52) U.S. Cl.
USPC .................. 55/523; 55/522; 55/524; 55/527; 140/5

(58) Field of Classification Search
USPC ................................ 55/522–524, 527; 140/5
See application file for complete search history.

(56) References Cited

U.S. PATENT DOCUMENTS

| | | | |
|---|---|---|---|
| 3,329,047 A * | 7/1967 | McTamany et al. ............ 82/173 |
| 4,020,891 A * | 5/1977 | Adler ............................. 164/462 |
| 4,940,562 A * | 7/1990 | Watanabe et al. ............. 264/234 |
| 5,204,067 A | 4/1993 | Haerle |
| 5,972,814 A * | 10/1999 | Schild et al. .................. 442/377 |
| 6,152,978 A | 11/2000 | Lundquist |

(Continued)

FOREIGN PATENT DOCUMENTS

| | | |
|---|---|---|
| EP | 0 553 637 A1 | 8/1993 |
| GB | 464 727 | 4/1937 |
| WO | 2004050219 A1 | 6/2004 |

OTHER PUBLICATIONS

International Search Report of PCT/EP2009/064025, Dated Mar. 5, 2010.

*Primary Examiner* — Amber Orlando
(74) *Attorney, Agent, or Firm* — Laurence A. Greenberg; Werner H. Stemer; Ralph E. Locher

(57) ABSTRACT

A nonwoven fabric for exhaust-gas treatment includes a multiplicity of metallic filaments having at least two types of different contours of the metallic filaments. An exhaust-gas purification device includes a channel structure through which exhaust gas can at least partially flow. The channel structure is made at least partially with such a nonwoven fabric. A method for producing a nonwoven fabric for exhaust-gas treatment is also provided.

7 Claims, 2 Drawing Sheets

U.S. PATENT DOCUMENTS

| | | | |
|---|---|---|---|
| 6,169,045 B1 * | 1/2001 | Pike et al. | 442/352 |
| 7,563,414 B2 | 7/2009 | Brück | |
| 2004/0159549 A1 * | 8/2004 | Park et al. | 205/77 |
| 2005/0232830 A1 | 10/2005 | Bruck | |
| 2008/0250775 A1 | 10/2008 | Bruck | |

* cited by examiner

NONWOVEN FABRIC FOR EXHAUST-GAS TREATMENT, EXHAUST-GAS PURIFICATION DEVICE AND METHOD FOR PRODUCING A NONWOVEN FABRIC FOR EXHAUST-GAS TREATMENT

CROSS-REFERENCE TO RELATED APPLICATION

This is a continuation, under 35 U.S.C. §120, of International Application No. PCT/EP2009/064025, filed Oct. 24, 2009, which designated the United States; this application also claims the priority, under 35 U.S.C. §119, of German Patent Application DE 10 2008 056 054.5, filed Nov. 5, 2008; the prior applications are herewith incorporated by reference in their entirety.

BACKGROUND OF THE INVENTION

Field of the Invention

The present invention relates to a nonwoven fabric for exhaust-gas treatment, including a multiplicity of metallic filaments. The invention also relates to an exhaust-gas purification device having a channel structure and a method for producing a nonwoven fabric for exhaust-gas treatment. The invention is used, in particular, for the purification of exhaust gases of mobile internal combustion engines.

Exhaust-gas purification devices of that type may serve different functions in exhaust systems of internal combustion engines. They are used, for example, as catalyst carrier bodies, as so-called adsorbers, as filters, as flow mixers and/or as mufflers. The channel structure is usually distinguished by a favorable ratio of surface area to volume, that is to say it forms a relatively large surface area and thereby ensures intensive contact with an exhaust-gas flow flowing past and/or through it. Exhaust-gas purification devices of that type include, for example, honeycomb bodies which are possibly constructed from a plurality of different components (metal sheets, mats, tubes, etc.) partially also with different materials (steel materials, ceramic substances, mixed materials, etc.). In view of the high thermal and dynamic loads in the exhaust systems of mobile internal combustion engines, such individual components must be permanently connected to one another. Different joining techniques are known for that purpose, for example brazing and/or welding.

With regard to the effectiveness of such exhaust-gas purification devices, it is desirable for the carrier for the catalyst and/or the filter material to be provided in such a way that, firstly, production is easily possible in medium series production, but at the same time, a significant conversion of the pollutants in the exhaust gas is attained even under varying load conditions of the mobile internal combustion engine. With regard to the filter material, it has already been proposed to use metallic and/or ceramic materials to retain the solid matter contained in the exhaust gas, such as for example particles, ash, soot and the like, and if appropriate convert the solid matter into gaseous constituents. Gas-permeable, porous fiber layers which are integrated in the manner of a woven fabric, knitted fabric or the like into the exhaust-gas purification device are proposed, in particular, for that purpose.

Recently, there has been increased discussion with regard to how the effectiveness of such exhaust-gas purification devices can be increased further with regard to particularly small particles. The so-called "fine dust" debate in Europe makes it clear that there is still demand for development in this field.

SUMMARY OF THE INVENTION

It is accordingly an object of the invention to provide a nonwoven fabric for exhaust-gas treatment, an exhaust-gas purification device and a method for producing a nonwoven fabric for exhaust-gas treatment, which overcome the hereinafore-mentioned disadvantages and at least partially solve the highlighted problems of the heretofore-known fabrics, devices and methods of this general type. It is sought especially to specify a nonwoven fabric which is suitable, in particular, for retaining and/or converting particularly small particles of solid matter contained in the exhaust gas. It should also be possible for the nonwoven fabric to be produced inexpensively and easily integrated into an exhaust-gas purification device.

With the foregoing and other objects in view there is provided, in accordance with the invention, a nonwoven fabric for exhaust-gas treatment. The nonwoven fabric comprises a multiplicity of metallic filaments. The metallic filaments have at least two types of different contours for exhaust-gas treatment.

In this case, "nonwoven fabric" means, in particular, an areal, coherent configuration of the metallic filaments, wherein the metallic filaments are positioned basically in a regular, but preferably in a chaotic, configuration relative to one another. The term "filament" is to be understood, in particular, as an all-encompassing term for fibers, wires, chips and the like. In this case, the filaments are formed preferably from a material which is resistant to high temperature and to corrosion. Consideration is given, for example, to steel as a base material, wherein high proportions of chromium (for example in a range of from 18 to 21 wt. %) and/or aluminum (for example at least 4.5 wt. %, in particular 5.5 wt. %) are provided. It is also proposed herein that metallic filaments with different contours be used. In this case, "contours" means, in particular, different external forms of the filaments. In this case, it is clear that not only is a change in the diameter and/or the length (and/or of the material) present in this case, but rather also the three-dimensional shapes differ significantly from one another. In this case, it is very particularly preferable for the filaments to be clearly assignable to the types. For example, one type of filaments may have a cross section and/or diameter which varies over the length, while another type of the filaments has a substantially constant cross section or diameter over the length. The different types of filaments may be disposed in a spatially distributed manner relative to one another in the nonwoven fabric, although it is also possible for specific zones with separate regions of filaments of only one type of contours in each case to be formed.

In accordance with another feature of the invention, in this context, it is preferable, in particular, for the at least two types of metallic filaments to have been generated by using different production methods. The production method has a considerable influence on the formed contour of the filaments, so that it is possible, in particular, for the respective contour to be inferred from the production method. In this respect, the production method and the ultimately provided contour of the metallic filament are closely related.

The selection of different contours of the filaments for a nonwoven fabric for exhaust-gas treatment has repercussions, for example, on the further machining steps. A nonwoven fabric is typically additionally coated. Often, a washcoat is applied which further increases the catalytically active surface of the nonwoven fabric material. The formation of whiskers out of the nonwoven fabric material itself by oxide formation is also possible. Under suitable oxidation, three-dimensional oxide structures grow out of the individual filaments, which oxide structures lead to a considerable enlargement of the surface area and therefore also to an improvement of the catalytic properties of the nonwoven fabric.

The deposition of coatings and/or the formation of oxide structures and whiskers on the material may be influenced significantly by the mixture of differently produced filaments of different contour. Differently produced filaments have, for example, different matrix and surface structures. As a result of the different deformation processes in the individual production methods, partial regions of the filaments are, if appropriate, electrochemically and/or galvanically activated and/or passivated. Through the use of a suitable mixture of differently produced filament types in a nonwoven fabric, the properties may be adapted so as to yield particularly advantageous behavior during the coating and/or during further processing of the nonwoven fabric, and therefore improved properties of the nonwoven fabric for the exhaust-gas treatment. It is thus possible, for example, through the use of different contours of the filaments, to attain desired orientations, distributions, etc. during the layering of the filaments to form a nonwoven fabric, a desired formation and/or concentration of sintered connections and/or a desired formation and/or concentration of an oxide layer through the use of a (uniform, common) heat treatment.

In accordance with a further feature of the invention, it is thus considered to be particularly advantageous for the different production methods to be selected from the following group:
a) separation from a metal block;
b) continuous filament generation from a metal melt;
c) discontinuous extraction from a metal melt; and
d) wire drawing.

The "separation from a metal block" includes, in particular, also milling, drilling, turning, planing, rasping, cutting or similar, in particular chip-producing, production processes. In this case, the chip constitutes the filament. While generally a (short) broken chip is generated in the case of milling, planing and rasping, very long chips can also be generated in the case of turning or drilling. A metal block means primarily a solid body which is formed from metal, wherein the explicit form of the body should be selected with regard to the production methods used for chip or filament production. Accordingly, the metal block may take the form of a cylinder, cuboid, wire or the like.

In the case of the continuous filament generation, a wire-shaped, very long or so-called "endless" fiber is produced from the metal melt. In this case, the filaments may be extruded or drawn individually, together or in bundles. A person skilled in the art may, for example, also refer to corresponding descriptions of wire production for an illustration of the production methods. In a further method encompassed herein, a continuous filament is drawn from a rotating cylindrical metal block, wherein the metal block is locally melted through the use of a laser, and a filament is generated from the melt. Highly uniform, high-quality wires can be produced in this way.

The discontinuous extraction of the filaments from a metal melt constitutes, in effect, a hybrid method of the two methods mentioned above. For example, a rotor having a structured circumferential surface is moved relative to the metal melt, wherein as a result of the intermittent contact, parts of the metal melt are removed from the bath which later cool to form the metallic filaments. In this case, discontinuous filaments are produced repeatedly at high speed.

In the case of wire drawing, a filament is worked out of a solid wire blank through the use of plastic deformation. For this purpose, for example at least one wire blank is pulled, through the use of drawing disks, through conically tapering drawing dies. The diameter is thereby reduced in each case. In order to obtain large reductions in diameter, the wire drawing may take place in several stages. Cooling stages or intermediate annealing stages may be provided between the stages, as a result of which the matrix properties of the wire material are influenced. The wire drawing may take the form of individual wire drawing, with only one wire in each case being pulled through a drawing die. Alternatively, in each case wire bundles may be pulled through the drawing dies. These are then referred to as bundle-drawn wires. This makes the wire drawing process considerably less expensive.

It is clear from the above descriptions that, depending on the method used, different contours of the filaments are generated which can be used in this case for constructing the nonwoven fabric. The use of different filaments has the effect that the properties of the nonwoven fabric which acts as a filter medium can be selected in a targeted manner, in particular with regard to surface roughness, porosity, mass per unit area, etc. Merely for the sake of completeness, it is pointed out that it is also possible for the different types of contours to be generated through the use of different manufacturing processes of one of the above-mentioned production processes.

Filaments extracted from a melt usually have predominantly a bread-shaped, loaf-shaped or kidney-shaped contour. The contours of filaments that have been separated from a metal block are usually distinguished by flat sides and/or sharp-edged transitions between the sides. The contours of individually drawn wires are normally round, and those of the bundle-drawn wires have a round basic shape with indentations. The indentations are generated during the pulling process as a result of the abutment of adjacent wires. This description should self-evidently be regarded (merely) as a guideline. The production processes used up to now permit considerable tolerances in this case, so that the above-mentioned features are present to a more or less pronounced extent. However, an evaluation of the entirety of the filaments of a nonwoven fabric will clearly show a corresponding difference between diverse contours.

The filaments produced through the use of the different methods also possibly differ in terms of their length distribution. Filaments extracted from the melt and filaments produced by wire drawing typically have very uniform length distributions with a low variance in the filament lengths. The filaments are usually initially produced in large lengths and subsequently broken down to lengths suitable for nonwoven fabric production. The lengths of the filaments separated from a metal block normally have a higher variance. Such filaments are typically produced in a chip-removing process. In this case, the process is carried out in such a way that a desired mean filament length is obtained. Due to the method, however, longer and shorter filaments are also generated. The filament lengths are generally distributed normally about a mean filament length. It is therefore clear that secondary indications of the use of such different filaments may be taken into consideration, if appropriate.

In accordance with an added feature of the invention, in one refinement of the nonwoven fabric, it is also proposed that the at least two types are disposed so as to be at least partially mixed with one another. This means, in particular, that the nonwoven fabric has, in particular in its main plane of extent, a plurality of layers or zones, wherein the different types are mixed with one another and/or disposed separately from one another. It is particularly preferable for the different filaments to be disposed so as to be (partially) mixed with one another, in such a way that (there) a nonwoven fabric is provided with substantially uniform properties over the thickness and the main plane of extent.

In the case of two different types, consideration is given to basically any mixing ratios with which both types are present in significant numbers with regard to their purpose. Mixing ratios are preferable in which each filament type amounts to at least 20%, that is to say 80:20 to 20:80. It is also preferable for a minimum proportion of each processed filament type to be present, for example 5% to 20%.

In accordance with an additional feature of the invention, in a very particularly preferred construction variant, precisely two types of different contours are realized in the nonwoven fabric, wherein one type of the metallic filaments is in wire form and one type of the metallic filaments is in chip form. The use of wire-shaped filaments makes it possible, in particular, to form a flexible base structure which provides the nonwoven fabric with the required support. The chip-like filaments, which are distinguished, in particular, by a relatively thin or slim end shaping, may form needle-like structures, in such a way that overall, the surface roughness and/or the pore size is influenced in such a way that it is possible in this case to generate regions, which are particularly suitable for coatings and/or the deposition of solid matter, with a stable bond to form the nonwoven fabric. Such particularly suitable regions may also be generated, for example, through the use of a non-uniform distribution of the different types of filaments.

With the objects of the invention in view, there is additionally provided an exhaust-gas purification device, comprising a channel structure configured to be at least partially traversed by a flow of exhaust gas. The channel structure is formed at least partially with a nonwoven fabric of the type described herein according to the invention.

The channel structure is, in particular, a type of honeycomb structure which is constructed with stacked and/or coiled layers. In this case, the layers may be constructed with nonwoven fabric and/or metal foils. The channels through which exhaust gas can flow may be open and/or alternately closed off. It is possible, in particular, for deflections, flow constrictions and the like to be formed in the channels in order to ensure that the exhaust gas entering into the channel structure is conducted or deflected in the direction of the nonwoven fabric and/or through the nonwoven fabric.

With the objects of the invention in view, there is also provided a method for producing a nonwoven fabric for exhaust-gas treatment. The method comprises generating a multiplicity of metallic filaments having at least two types of different contours for exhaust-gas treatment, by using different production methods, such as separation from a metal block, continuous filament generation from a metal melt, discontinuous extraction from a metal melt or wire drawing.

In accordance with a concomitant mode of the invention, the method may further include at least partially mixing the metallic filaments having at least two types of different contours with one another, sintering the metallic filaments having at least two types of different contours with one another and the at least two types of different contours may include one type in wire form and another type in chip form.

Other features which are considered as characteristic for the invention are set forth in the appended claims, noting that the features specified individually in the claims may be combined with one another in any desired technologically expedient manner and form further embodiments of the invention.

Although the invention is illustrated and described herein as embodied in a nonwoven fabric for exhaust-gas treatment, an exhaust-gas purification device and a method for producing a nonwoven fabric for exhaust-gas treatment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
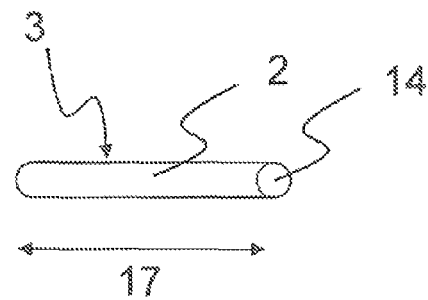
FIG. 1 is a diagrammatic, perspective view of a first type of a filament.

Referring now in detail to the figures of the drawing for explaining the invention and the technical field in more detail by showing particularly preferred structural variants to which the invention is not restricted, and first, particularly, to FIG. 1 thereof, there is seen a diagrammatic illustration of a first type of a metallic filament 2 having a substantially wire-shaped contour 3. The wire-shaped contour 3 may be described as forming a substantially uniform filament cross section 14 in a longitudinal direction 17, in which the cross section 14 is perpendicular to the longitudinal direction 17. It is clear that a wire-shaped filament 2 of this type need not be incorporated in the nonwoven fabric in the straight form shown herein, but rather may also be bent, if appropriate.

Figure 2:
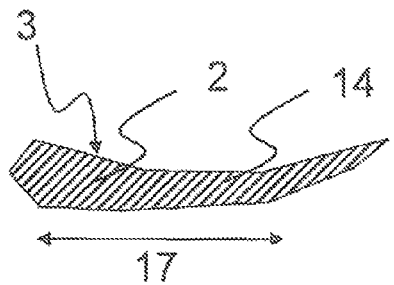
FIG. 2 is a cross-sectional view of a second type of a filament.

In contrast, FIG. 2 shows a different type of filament 2 which has a substantially chip-shaped, splinter-shaped or sliver-shaped form or contour 3, that is to say it has a filament cross section 14 which is not uniform in the longitudinal direction 17. In fact, the filament cross section 14 varies in shape and/or size in the longitudinal direction 17 of the filament 2. It is preferable in this case for the filament 2 to be formed with end regions in the longitudinal direction 17 which have different thicknesses.

The metallic filaments are usually formed with a filament length in a range of from 0.1 to 50 mm (in particular in a range of from 1 to 10 mm) and a filament diameter in a range of from 0.01 to 0.1 mm (in particular a range of from 0.02 to 0.05 mm).

Figure 3:
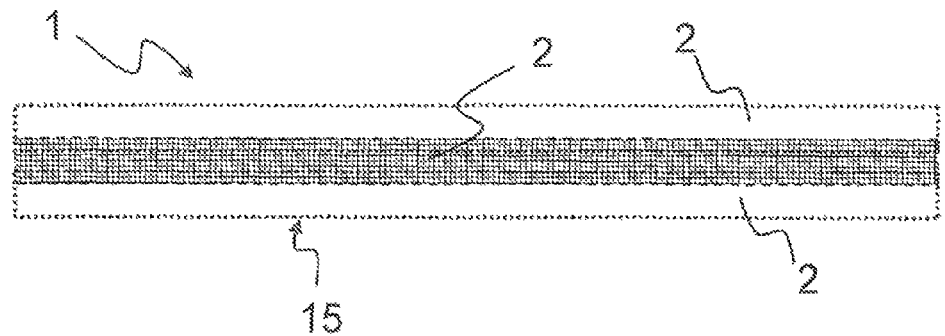
FIG. 3 is a longitudinal-sectional view of a structural variant of a nonwoven fabric.

FIG. 3 shows a structural variant of a nonwoven, mat, fleece or nonwoven fabric 1 which has a layered construction. Disposed centrally therein is a first type of filament 2 with a first contour, while upper and lower outer surfaces 15 are formed with filaments 2 having a second contour. It is, for example, preferable for wire-shaped filaments 2 to be used in central regions, while filaments 2 in chip, splinter or sliver form are provided close to the respective outer surface 15. In order to ensure a secure bond of the nonwoven fabric, one transition region is provided in each case in which the filaments 2 of the different regions are connected to one another by technical joining, for example by welding and/or sintering.

Figure 4:
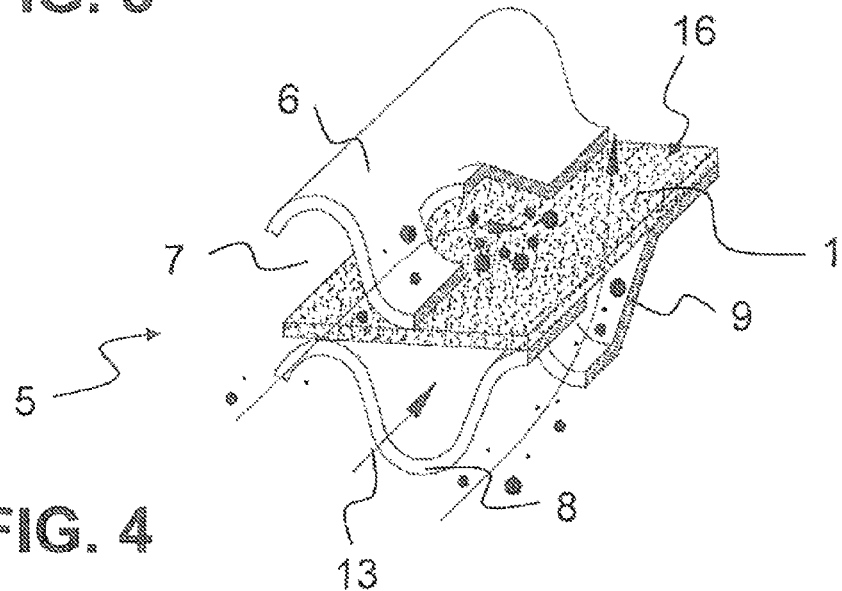
FIG. 4 is a fragmentary, perspective view of a portion of an exhaust-gas purification device in the form of an open particle separator.

FIG. 4 shows details of the construction of a channel structure 5, in which the channel structure 5 is formed with metal foils 6 and a nonwoven or nonwoven fabric 1 in this case. The metal foils 6 have a corrugated structure 8, in such a way that, through the use of the metal foils 6 and the nonwoven fabric 1, a multiplicity of channels 7 are formed through which exhaust gas can flow. Furthermore, constrictions 9 are formed which project into the channels 7, for example by the formation of suitable projections or guide blades which cause the exhaust-gas flow to be deflected toward the nonwoven fabric 1. Particles are contained in the exhaust gas flowing in a flow direction 13 and are therefore guided into or onto the nonwoven fabric 1. The particles accumulating there can be converted continuously (in a CRT process) or discontinuously and therefore the nonwoven fabric 1 and/or the metal foil 6 may be formed with a corresponding coating 16.

Figure 5:
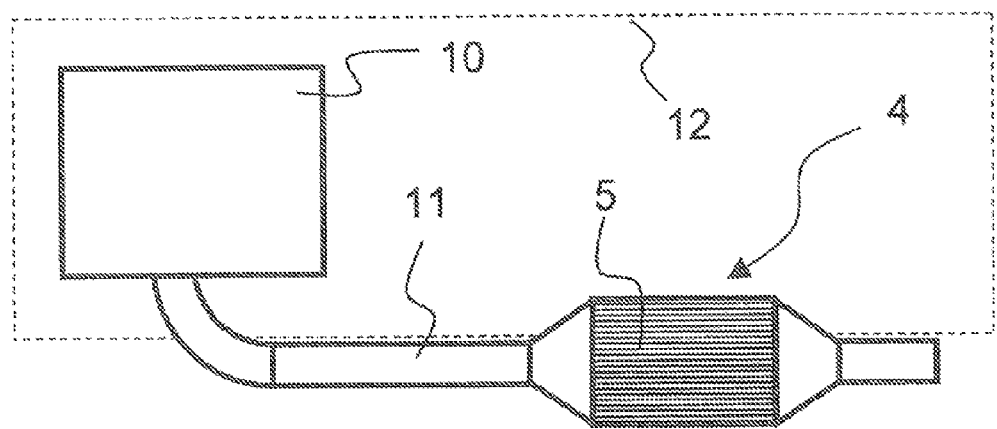
FIG. 5 is a plan view showing a construction of a mobile exhaust-gas purification system.

FIG. 5 shows a possible structural variant to be used in systems for the treatment of mobile combustion residues. The illustration shows an internal combustion engine 10 which produces the exhaust gas. The exhaust gas is then conducted through a corresponding exhaust system 11. Part of the exhaust system 11 is an exhaust-gas purification device 4 with a channel structure 5 through which the exhaust gas is conducted. A purification of the exhaust gas, in particular a conversion of pollutants in the exhaust gas, takes place in the exhaust-gas purification device 4, in such a way that the exhaust gas can be discharged in purified form to the environment. The internal combustion engine and the exhaust system are generally part of a motor vehicle 12. It is immediately self-evidently clear that FIG. 5 shows merely a diagrammatic exemplary embodiment, whereas a greater number of exhaust-gas purification devices 4 will generally be used. An embodiment of an exhaust-gas purification device 4, in particular in the form of an open particle separator, is diagrammatically proposed in this case.

FIGS. 6, 7, 8 and 9 diagrammatically and categorically show different contours 3 of filament cross sections 14 of different filaments 2. The respective contour shapes in the figures may typically be associated with certain production processes.

Figure 6:
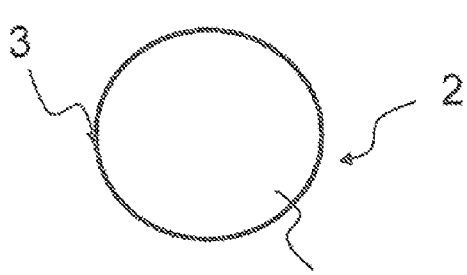
FIGS. 6-9 are cross-sectional views showing different contours of filaments.

FIG. 6 shows the filament cross section 14 of a filament 3 which is formed in the manner of an individually drawn wire. The filament cross section 14 is typically distinguished by a round shape, because drawing dies for wires are generally round. Individually drawn wires are seldom used because the production process is very expensive and complex.

Figure 7:
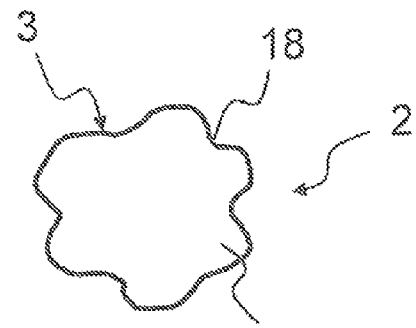

FIG. 7 shows a filament 3 which has been produced by bundle-drawing. In the case of bundle wire drawing, a plurality of wires are drawn in parallel as a bundle through one drawing die. In this case, the individual wires bear against one another and are deformed correspondingly to contact regions of the surrounding filaments. Deviations (in this case indentations 18) from a round filament shape are therefore formed in the contour 3 in the filament cross section 14.

Figure 8:
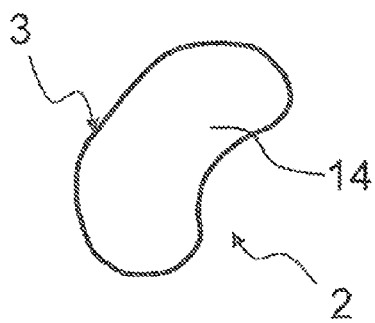

FIG. 8 shows a filament cross section 14 of a filament 2 that has been extracted from a melt. It has a bread-like, loaf-like or kidney-like shape. In a typical production process for melt-extracted filaments, a rotating disk or a rotating rotor is dipped into a melt and slings a "jet" out of the melt. The jet solidifies. Due to the shape of the dipped disk and the forces acting during the solidification process, the bread-like, loaf-like or kidney-like shape is formed.

Figure 9:
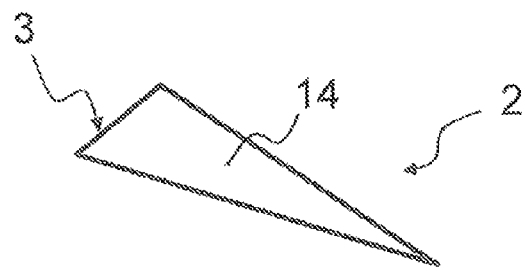

FIG. 9 shows a characteristic filament cross section 14 of a filament 2 produced by separation from a metal block. The separation from the block may take place through the use of "scraping" or chip-removing methods. In this case, consideration is given to methods such as turning, milling, planing, rasping, cutting and/or drilling. The contour 3 of such filaments 2 is generally distinguished by flat sides which correspond to the shape of the machining tool. There are typically sharp-edged transitions between the sides.

The invention claimed is:

1. A nonwoven fabric for exhaust-gas treatment, the nonwoven fabric comprising:
   a multiplicity of metallic filaments;
   said metallic filaments having at least two types of different contours for exhaust-gas treatment, said at least two types of different contours including one type in wire form and another type in chip form, said at least two types of different contours having characteristics of metallic filaments being generated by using different production methods;
   the different production methods being:
   separation from a metal block; and
   wire drawing; and
   a layered construction with said metallic filaments in wire form being disposed centrally in said layered construction and said metallic filaments in said chip form are disposed closer to an outer surface of said layered construction.

2. The nonwoven fabric according to claim 1, wherein said metallic filaments having at least two types of different contours are disposed so as to be at least partially mixed with one another.

3. The nonwoven fabric according to claim 1, wherein said metallic filaments having at least two types of different contours are sintered with one another.

4. An exhaust-gas purification device, comprising:
   a channel structure configured to be at least partially traversed by a flow of exhaust gas;
   said channel structure being formed at least partially with a nonwoven fabric according to claim 1.

5. A method for producing a nonwoven fabric for exhaust-gas treatment, the method comprising the following steps:
   generating a multiplicity of metallic filaments having at least two types of different contours for exhaust-gas treatment, the at least two types of different contours include one type in wire form and another type in chip form and being generated by using different production methods the different production methods being:
   separation from a metal block; and
   wire drawing; and
   creating a layered construction by disposing the metallic filaments in wire form centrally in the layered construction and by disposing the metallic filaments in the chip form closer to an outer surface of the layered construction.

6. The method according to claim 5, which further comprises at least partially mixing with one another the metallic filaments having at least two types of different contours.

7. The method according to claim 5, which further comprises sintering with one another the metallic filaments having at least two types of different contours.

* * * * *